(12) United States Patent
Scholz

(10) Patent No.: US 8,235,224 B2
(45) Date of Patent: Aug. 7, 2012

(54) KNOCKDOWN SHELVING SYSTEM FOR STORING VEHICLE WHEEL SETS

(75) Inventor: Gottfried Scholz, Biederthal (FR)

(73) Assignee: Irega AG, Zuchwil (CH)

( * ) Notice: Subject to any disclaimer, the term of this patent is extended or adjusted under 35 U.S.C. 154(b) by 0 days.

(21) Appl. No.: 13/340,728

(22) Filed: Dec. 30, 2011

(65) Prior Publication Data

US 2012/0111808 A1   May 10, 2012

Related U.S. Application Data

(63) Continuation of application No. PCT/EP2011/058620, filed on Jun. 23, 2011.

(30) Foreign Application Priority Data

May 26, 2010   (DE) ..................... 20 2010 005 700 U

(51) Int. Cl.
    *A47F 7/04*   (2006.01)
(52) U.S. Cl. .......................................... 211/23
(58) Field of Classification Search .......... 211/23, 211/189, 182, 191, 192, 183, 103, 175, 24, 211/85.8, 188, 190, 134; 312/257.1, 265.1–265.5
    See application file for complete search history.

(56) References Cited

U.S. PATENT DOCUMENTS

| | | | |
|---|---|---|---|
| 2,937,767 A * | 5/1960 | Butler et al. | 211/191 |
| 3,127,995 A * | 4/1964 | Mosinski | 211/191 |
| 3,465,895 A * | 9/1969 | Miller | 211/191 |
| 3,475,044 A * | 10/1969 | Konstant | 403/217 |
| 3,510,010 A * | 5/1970 | Gasner | 211/192 |
| 3,592,345 A * | 7/1971 | Featherman | 211/191 |
| 3,638,981 A * | 2/1972 | Weider | 403/190 |
| 3,647,079 A * | 3/1972 | Ohlin | 211/192 |
| 3,647,080 A * | 3/1972 | Denny | 211/191 |
| 3,672,515 A * | 6/1972 | Rous | 211/191 |
| 3,733,755 A * | 5/1973 | Butler | 52/36.6 |
| 3,862,691 A * | 1/1975 | Mori et al. | 211/191 |
| 4,158,998 A * | 6/1979 | Clement | 108/147.15 |
| 4,197,952 A * | 4/1980 | De Fouw et al. | 211/191 |
| 4,342,397 A * | 8/1982 | Halstrick | 211/191 |
| 4,708,252 A * | 11/1987 | Azzi | 211/192 |
| 4,729,484 A * | 3/1988 | McConnell | 211/183 |
| 4,778,067 A * | 10/1988 | Bellerose | 211/187 |
| 4,801,026 A * | 1/1989 | Andersson | 211/183 |

(Continued)

FOREIGN PATENT DOCUMENTS

DE   1178564   9/1964

(Continued)

*Primary Examiner* — Jennifer E. Novosad
(74) *Attorney, Agent, or Firm* — Smartpat PLC; Axel Nix

(57) ABSTRACT

Disclosed is a knockdown shelving system which comprises a plurality of connected shelves with storage compartments that are configured to store vehicle wheels or tires upright and parallel to each other. Vertical posts are located at each corner of the connected shelves and shared between adjacent shelves. The vertical posts are formed of a rolled hollow T-profile which comprises rows of longitudinally spaced perforations that extend along the vertical posts. The vertical posts are connected by lengthwise and crosswise struts, the struts having hooks which engage the perforations of the vertical posts. Storage compartments for tires or wheels are formed by tire carriers which are placed onto lengthwise struts and extend parallel between front and rear vertical posts, and by crosswise struts which extend perpendicular to the tire carriers between two front vertical posts and two rear vertical posts, respectively.

4 Claims, 4 Drawing Sheets

U.S. PATENT DOCUMENTS

| | | | |
|---|---|---|---|
| 4,805,787 A * | 2/1989 | Gillotte | 211/191 |
| 5,377,851 A * | 1/1995 | Asano et al. | 211/191 |
| 5,540,340 A * | 7/1996 | Betteley et al. | 211/183 |
| 6,129,224 A * | 10/2000 | Mingers | 211/193 |
| 7,191,907 B2 * | 3/2007 | Conway | 211/180 |
| 2002/0153341 A1 * | 10/2002 | May et al. | 211/192 |
| 2007/0062898 A1 * | 3/2007 | Choi | 211/192 |

FOREIGN PATENT DOCUMENTS

| | | |
|---|---|---|
| DE | 202009000061 | 5/2009 |
| FR | 2516770 | 5/1983 |
| NL | 8000376 | 7/1980 |

* cited by examiner

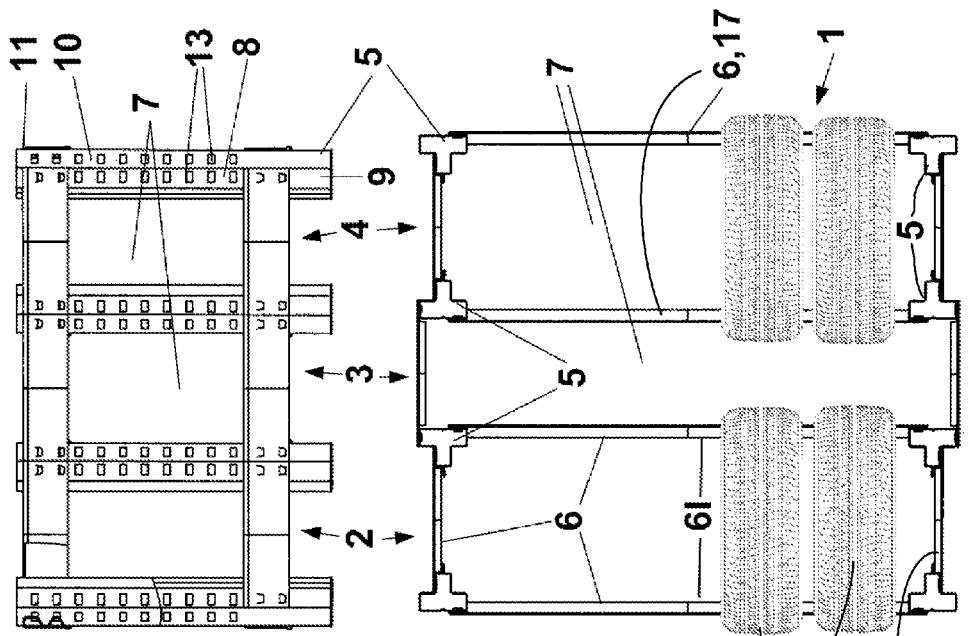
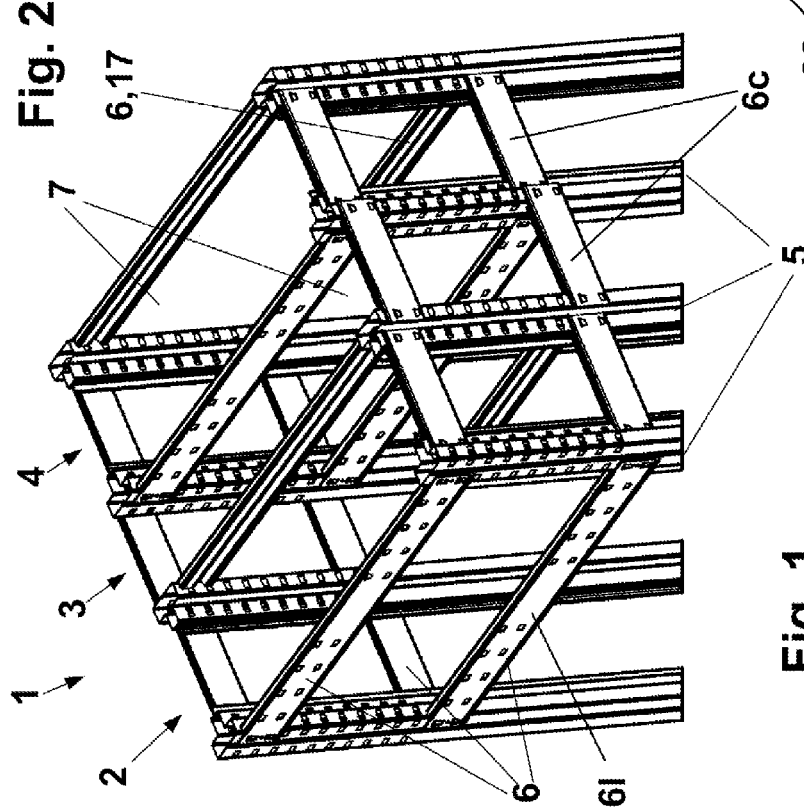

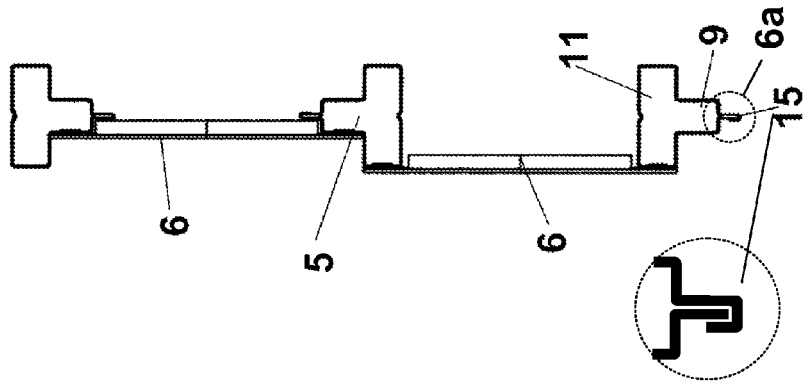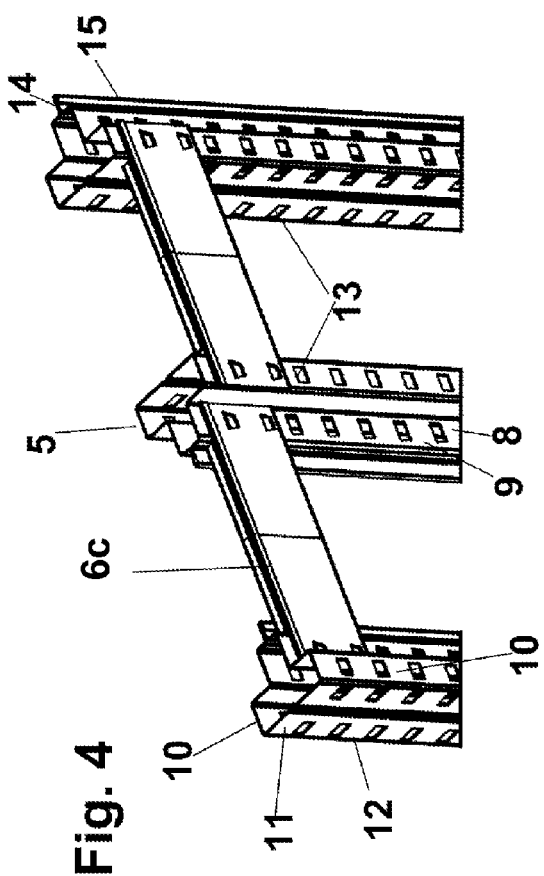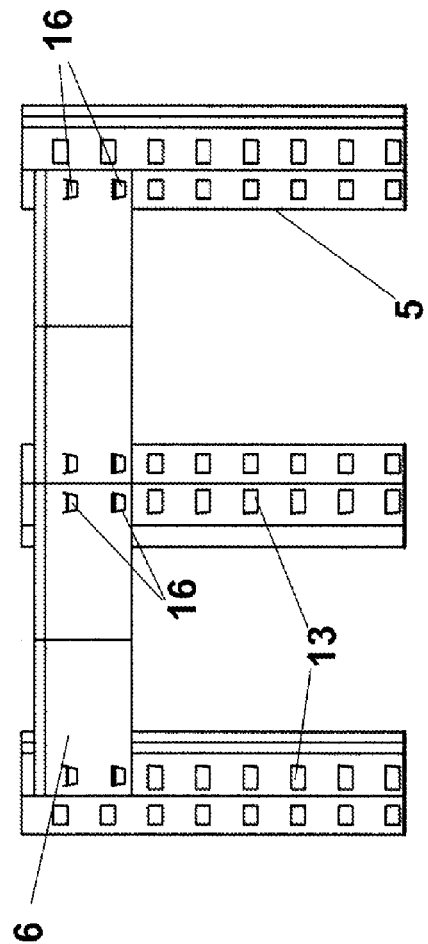

KNOCKDOWN SHELVING SYSTEM FOR STORING VEHICLE WHEEL SETS

TECHNICAL FIELD

The invention relates to a knockdown shelving system for storing sets or vehicle wheels or tires, comprising a plurality of connected shelves with storage compartments that are configured to store vehicle wheels or tires upright and parallel to one another, the wheels or tires resting on their running surface.

BACKGROUND

A large number of shelves or shelving systems are known, whose individual parts, such as vertical posts, side ladders or struts and shelf bottoms are connected to each other by means of different fastening types, for instance by welding or screwing. Such shelves usually present several vertical posts on the shelf corner points to which one or several horizontal shelf bottoms are fastened at certain vertical distances on which objects are stored.

The shortcoming of such shelves or shelving systems is that said elements cannot be disassembled any longer depending on the type of connection nor adapted to suit the users' requirements. Thus, said shelves or shelving systems still present a high stability, however the variation in size and number of the shelf bottoms in the shelf or shelving system is strongly limited. Moreover, these shelves or shelving systems are difficult to transport due to the space required by the fixed connection.

Moreover, a large number of shelves or shelving systems are known, in which the shelving parts, such as shelf bottoms, vertical posts, struts etc. are joined for example using groove-spring-connections. With certain systems, the supporting boards are simply laid on stays or pins on the struts. This provides high instability of the shelving system. Screwed shelves or shelving systems which are connected by special connection elements can only be assembled or disassembled at great expense so that said people in charge have assembly or disassembly problems.

Document WO 03/028506 A1 discloses a shelving system for storing and archiving objects, substantially comprising at least one shelf with rectangular cross section, to whose corner points vertical posts are arranged, whereas between two front vertical posts, horizontal struts can be mounted for fastening shelf bottoms provided with a downward directed front tab and the vertical posts present recesses for accommodating pairs of hooks on the struts, said hooks being spaced apart vertically and horizontally as well as directed downwards. The downward directed front tab of the shelf bottom is clenched between the strut and the vertical posts of the shelf which support said strut in a clamping manner.

Commonly vehicle owners store their summer and/or winter wheels or tires not at home, but for instance at tire or car dealers. Wheels or tires are there stored in shelves. Over the last years, due to the development of the automotive industry, i.e. the tendency to produce larger and more powerful and hence heavier motor vehicles, the wheels have become wider and larger. This sets new requirements to the storage shelves, in particular as regards size, dimensions and stability. Fuel for motor vehicles can be predicted to become scarcer and more expensive in the future. Vehicles are equipped with alternative drive systems, for example with electric motor and heavy batteries, so that the vehicles and hence the wheels as well as the tires may become larger and heavier. On the other hand, the motor vehicles may also become lighter to save on driving energy, so that the wheels and tires become smaller and narrower.

Wheels and tires are however stored in storage compartments, whereas the sizes and dimensions of the compartments are usually always identical. This has considerable shortcomings in terms of usage of the existing room as well as of the size and design of the shelves.

For storing of the wheels and tires in the compartmented shelves, no more than 4 of them stand side by side usually. The storing of 4 items in pairs, hence 2 side by side and 2 behind one another in so-called knockdown shelves and 4 items behind one another in so-called magazine shelves is known. Every compartment has consequently its corresponding width. I.e. when storing small wheels and tires, the size of the compartment is not fully used and storage room is wasted. In contrast, when storing large wheels and tires, the space requirement in the existing shelf compartments is not sufficient for instance for a wheel set. Additionally, the vehicle wheels and tires are prone to fall for instance when the compartments are too big, because said wheels and tires have a tendency to tip over to one side or to roll away sideways since the rim, due to its asymmetrical construction in its cross-section, is heavier on one side than on the other side.

Accordingly, it is desirable to individually adjust the compartments accordingly to the requested wheel and tire widths or sizes and to adapt the storing of the wheels and tires according to the parameters.

SUMMARY

The present disclosure describes a knockdown shelving system for storing sets of vehicle wheels or tires. The system, which is easy and comfortable to use, allows space-efficient storage of complete vehicle wheel sets. It comprises individually adjustable storage compartments, and can be adapted to fit within the space constraints of existing premises.

The disclosed knockdown shelving system for storing vehicle wheels or tires comprises a plurality of connected shelves with storage compartments that are configured to store vehicle wheels or tires upright and parallel to each other. The wheels or tires rest on their running surface within the storage compartments. Vertical posts are located at each corner of the connected shelves. Adjacent shelves share two vertical posts with their neighboring shelf.

The vertical posts are made of a rolled hollow profile with a T-shaped cross-section, hereafter also referred to as a T-profile. The T-profile comprises a flange section and a stem section. The two vertical edges of the hollow profile are folded into one another at the lower end of the stem section of the T-profile. The vertical posts comprise rows of longitudinally spaced perforations of identical form, size, and spacing. The rows extend along the entire length of the vertical posts. Each vertical post has eight such rows:

Two rows are located at the side surfaces of the stem section of the T-profile, one on each side.

Two rows are located at the side surfaces of the flange section of the T-profile, one on each side.

Two rows are located at the flange section of the T-profile facing the stem section, one on each side.

Two rows, spaced apart from one another, are arranged at the flange section of the T-profile opposite the stem section.

The vertical posts are connected by struts with downward-directed hooks which engage vertically into the perforations of the vertical posts. Each strut comprises four hooks, two at each end arranged vertically separated. Struts are used to connect adjacent vertical posts. More specifically, two adjacent front vertical posts are connected by crosswise struts, as are two adjacent rear vertical posts.

Adjacent front and rear vertical post are connected by lengthwise struts. Tire carriers, extending front to back, may be placed onto lengthwise struts. The tire carriers comprise a rear wall, two bulges arranged on top of one another, each forming a cavity. Perforations are provided through which the hooks of lengthwise struts, onto which the tire carrier is placed, engage the perforations of the vertical posts.

Storage compartments for tires or wheels are formed by two tire carriers extending parallel between front and rear vertical posts, and by crosswise struts extending perpendicular to the tire carriers between two front vertical posts and two rear vertical posts, respectively.

Within the context of this disclosure the term "wheels" refers to tires and rims of vehicles, both joined together and each individually. The disclosed storage system is suitable to store tires, rims, and wheel assemblies.

The shelving system may comprise a plurality of shelves, which are arranged side by side next to one another and/or end to end behind one another. Adjacent shelves share common vertical posts and are respectively connected with one another by struts and tire carriers. Complete sets of vehicle wheels can be stored in this knockdown shelving system. The knockdown shelving system is easily assembled by connecting vertical posts, struts, tire carriers and shelf bottoms. The connections are made by engaging hooks into respective perforations. This boltless design does not require any mechanical fasteners, such as screws or bolts.

Vehicle wheels of a respective set are preferably stored upright behind one another in adjacent shelves of the knockdown shelving system. Thus, a first wheel set consisting of four vehicle wheels may occupy one row within four adjacent shelves. Multiple sets of vehicle wheels may be stored parallel to each other.

It is particularly advantageous that wheels, rims, and tires of different size can be stored in the knockdown shelving system. This can be achieved in such a way that, seen in cross-section, a row of perforations is arranged respectively at each of the T-shaped vertical posts, on both side surfaces of the stem section thereof and on all surfaces of the flange section thereof, including two rows of perforations spaced apart from one another are arranged in a locking manner at the upper external surface of the flange section thereof, over the whole length of the vertical posts.

The longitudinally spaced perforations at the vertical posts provide flexibility in attaching struts and tire carriers at various heights, thereby adjusting the height of resulting storage compartments. Struts and tire carriers may for example be vertically spaced further apart to create storage compartments for large wheels. They may also be vertically spaced closer together to create storage compartments for small wheels. Further variations can be achieved by use of vertical posts, struts, and tire carriers of various lengths. This allows variations and possible adaptations of the storage compartments dimensions in height, width and depth, which are determined by the length of the struts and tire carriers as well as the length and width of the shelf bottoms. The variability and possible adaptations of the dimensions of the compartments and shelves are enabled by the identical form, size, and spacing of all perforations at the vertical posts. Hooks are configured to engage the perforations of the vertical posts, i.e. the hooks or hook pairs of the struts are congruent to the lockable rows of holes of the vertical posts.

Previously known vertical posts utilize a rolled hollow profile. The known hollow profile however does not connect its edges and hence forms a gap. The assembly is thus relatively little torsion-resistant. In an improved profile the profile ends, that is the vertical edges of the vertical posts, are now squeezed together, and preferably folded into one another, so that the vertical post is closed from all sides in its cross-section. This improves torsional stiffness of the vertical post, and improves the stability of the vertical post considerably.

The disclosed tire carriers replace the longitudinal braces or guide rods of known storage shelves. The new tire carrier comprises bulges, which increase stability of the tire carrier, enabling it to bridge the length of the storage compartment. The tire carrier has a rear wall and, seen in cross-section, two bulges arranged on top of one another, each forming a cavity. The tire carrier comprises a plurality of perforations. Two perforations at each end allow lengthwise struts, onto which the tire carrier is placed, to reach through the tire carrier and connect to the vertical posts. Accordingly, the form, dimension and pitch of the perforations correspond to those of the vertical posts and hence also to the hooks or hook pairs of the struts. Further perforations along the tire carrier are provided for added flexibility. The tire carrier is formed in such a way that it can be suspended into the strut with its back. The hooks of the strut engage through the perforations into the cavities of the bulges of the tire carrier. Consequently, the strut on the vertical post and the tire carrier on the strut are always suspended on two points. This provides improved locking and stabilization of the whole knockdown shelving system.

The increased stability of the vertical posts allows use of thinner sheet metal. Approximately one third of the material required for traditional posts can be saved. Even though lighter, the carrying capacity of the vertical post is significantly increased. This higher carrying capacity allows wider storage compartments needing fewer vertical posts. Storage compartments may be twice as large as those of traditional systems, resulting in 50% fewer vertical posts. As a whole, more stable vertical posts enable a material saving of about two thirds compared to traditional systems.

Due to its advanced design the disclosed knockdown shelving system provides a stable long span shelf with less material than known systems. The boltless connection of vertical posts and struts allows easy modification of the knockdown shelving system, e.g. converting it into a multifunctional shelf, into a shelf for storing of tires in pairs, or into a magazine shelf with the storage of four wheels behind one another having roll-down shelves and guide braces. Roll-down shelves and guide braces can also be retrofitted, whereas the guide braces enable to rest and to guide the upstanding wheels when inserting them into and removing them from the shelf. Consequently, this solution first enables using optimally the spaces even later with modified wheels sizes. Thus, the compartment widths, also only individually, can be modified at a later stage without converting the whole shelf. At least, the tubular guide braces can be covered with synthetic material, for protecting protruding rim portions. This can also be retrofitted.

To withdraw the vehicle wheels of a set from the knockdown shelving, the front one of the four vehicle wheels is first removed from the front shelf. To withdraw the second wheel of the wheel set from the shelf situated behind the first shelf, said wheel is simply rolled over the tire carrier of the second shelf forwards into the front shelf, preferably using an appropriate gripping instrument and can be removed from said front shelf. The third and fourth vehicle wheels are removed from the knockdown shelving system in the same way. The gripping instrument can be a rake-like tool, a tie rod which can be placed around the vehicle wheels, or similar.

For storing the wheels of a wheel set, said wheels are positioned in reverse order in the front, second, third and rear shelves.

A telescopic pick-up tool has been developed for the knockdown shelving system for that purpose, which is extendible and has an L-shaped attachment at the front, which is covered. The L portion of the tool reaches into the cavity of the rim and the wheel rolls out or is pushed inside.

Moreover, the wheels of a wheel set can be placed in and removed from the knockdown shelving simply and comfortably. Additionally, the belonging of a wheel set is clearly visible to the warehouse staff since said vehicle wheels are arranged behind one another.

The knockdown shelving system consists of a plurality of horizontal and vertical compartments which are formed by the horizontal tire carriers and struts. Many such compartments can be provided in several levels on top of one another and in layers close to one another in the knockdown shelving system, so as to increase the storage capacity of vehicle wheels considerably. The size of the compartments of the shelves is determined depending on the dimensions of the vehicle wheels, such as tire width and wheel diameter, and are determined according to the spatial conditions.

According to a further embodiment of the knockdown shelving system the tire carrier exhibits a support on its upper side, on which the strut is laid and on which the wheel or the tire rests. This increases the stability of the tire carrier further together with the strut over the whole width of the compartment.

The tire carrier may consist of a rolled hollow profile, whereas the downward-facing edges of the hollow profile are folded into one another. This beading enables to close the cross-section of the tire carrier and to make it stable in order to prevent any torsion.

According to a further embodiment of the knockdown shelving system, a shelf bottom is suspended into the strut by clamping, whereas the strut is designed in the form of a pocket and a downward protruding side wall is articulated on each of the sides of the shelf bottom, which engages into the pocket of the strut.

The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

FIG. 1 is a perspective view of a portion of the knockdown shelving without vehicle wheels.

FIG. 2 is a side view of the knockdown shelving system according to FIG. 1.

FIG. 3 is an elevational view of the knockdown shelving system according to FIGS. 1 and 2.

FIG. 4 is an enlarged perspective view of a portion of the knockdown shelving according to FIG. 1.

FIG. 5 is a side view of the knockdown shelving system according to FIG. 4.

FIG. 6 is an elevation view of the knockdown shelving system according to FIG. 4.

FIG. 6a is an enlarged view of parts of a vertical post as in FIG. 6.

DETAILED DESCRIPTION

Figure 8:
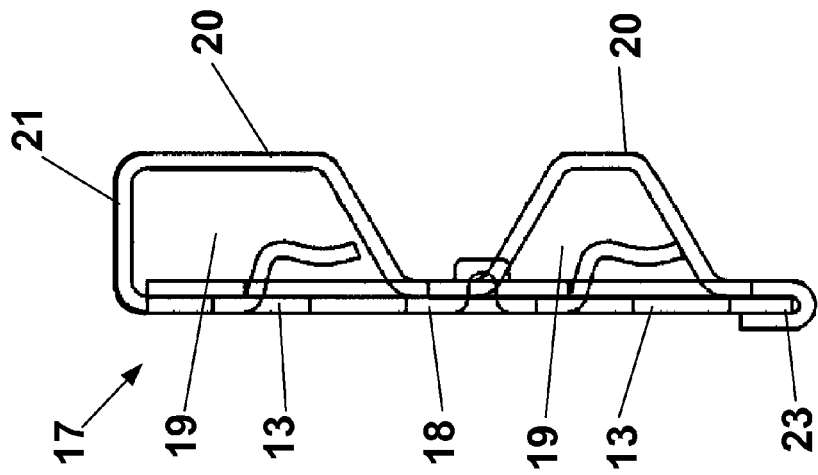
FIG. 8 is a side view of the tire carrier according to FIG. 7.

FIGS. 1 to 6 show a portion of a knockdown shelving system 1, which consists of three shelves 2, 3 and 4 that are arranged side by side. Knockdown shelving system 1 may consist of more or fewer shelves. Also, shelves within the knockdown shelving system 1 may be arranged side by side, as shown, or in a row. The knockdown shelving system presents a rectangular contour and consists preferably completely of sheet metal material. The knockdown shelving system is configured to store vehicle wheels or tires 22 upright and parallel to each other, such that the wheels or tires rest on their running surface A vertical post 5 is situated at each corner of the knockdown shelving system 1 and its shelves 2 to 4. The vertical post consists of a rolled hollow profile made of flat strip material. The vertical posts 5 are connected to one another through several horizontal struts 6, spaced apart relative to one another, so that the shelves 2 to 4 and hence the knockdown shelving system have longitudinal and transverse stability. Struts 6 comprise crosswise struts 6c, which connect posts 5 at the ends of knockdown shelving system 1. Lengthwise struts 61 connect posts 5 at the sides of knockdown shelving system 1. The longitudinal dimensions of the lengthwise struts 6l and the crosswise struts 6c define the size of the shelf and hence the size of the compartments 7 as well. The struts 6 are connected to different points of the vertical posts 5. Each end of strut 6 is fastened to two points on the vertical post 5. A vertical post 5 forms either a corner point of the external contour of the knockdown shelving system 1 or the connection of two neighboring shelves 2 to 4. The vertical post 5 has a T-shaped cross-section.

As can be seen in particular on FIGS. 2 and 4, each vertical post 5 has a T-shaped cross-section, comprising a stem section 9 and a flange section 11. A row of holes is arranged respectively at each vertical post 5, on both side surfaces 8 of the stem section 9 thereof and on both front side surfaces 10 of the flange section 11 thereof, as well as two rows of holes spaced apart from one another are arranged in a locking manner at the external surface 12 of the flange section 11 opposite the stem section 9 thereof, over the whole length of the vertical post 5. To do so, the perforations 13 of the rows of holes have each identical form, sizes and spacing.

Both vertical edges 14 of the hollow profile are folded into one another on the lower side 15 of the stem section 9 of the vertical post 5, seen in cross-section, as shown in particular in FIG. 4.

As illustrated schematically in FIGS. 3 and 6, the struts 6 are arranged on the vertical posts 5. The struts 6 can thus be fastened to the lateral surfaces 8 of the portion 9 with vertical cross-section, to the side surfaces 10 of the flange section 11 and to the upper external surface 13 of the flange section 11 of the vertical post 5.

A pair of downward directed horizontal and vertical hooks 16, which are spaced apart relative to one another are each formed at the rim sections of each strut 6. The hooks 16 engage with the perforations 13 of the vertical posts 5 of the knockdown shelving system 1 or of the shelves 2 and 4. To do so, the hooks 16 or pairs of hooks 16 are formed in a locking manner and congruently with respect to the perforations 13 of the vertical posts 5.

Figure 7:
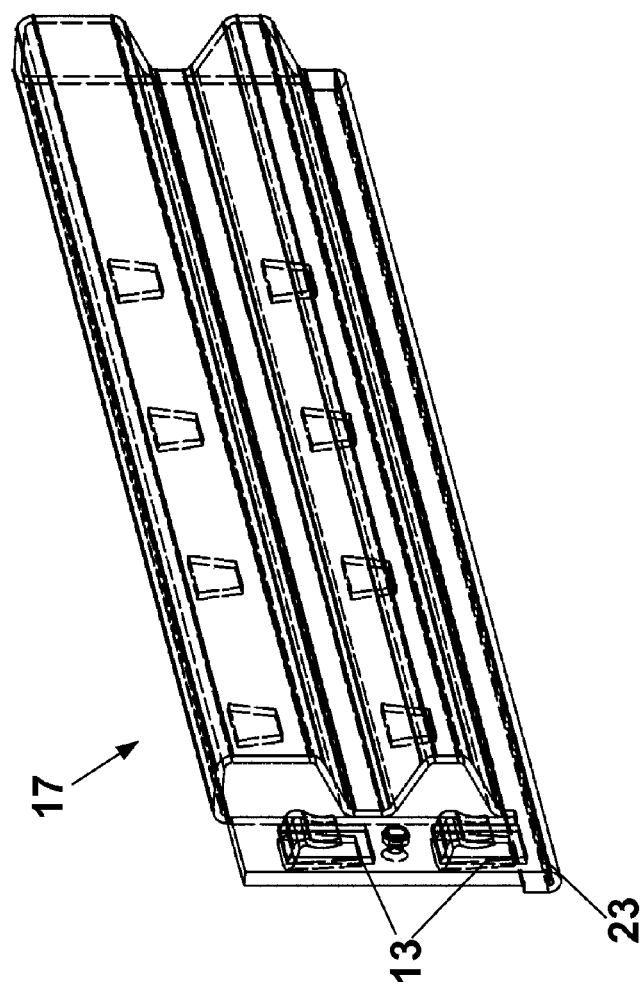
FIG. 7 is a perspective view of a tire carrier for a knockdown shelving.

FIGS. 7 and 8 in particular show a tire carrier 17, which consists of a rolled metal band material and formed as a single piece. It has a rear wall 18 and, seen in cross-section, two bulges 20 arranged on top of one another, each forming a cavity 19 each with a perforation 13. When the knockdown shelving system 1 is in installed condition, the hooks 16 of the strut 6 engage through the perforations 13 into the cavities 19 of the bulges 20 of the tire carrier 17. Consequently, the strut 6 on the vertical post 5 and the tire carrier 17 on the strut 6 are always suspended on two points.

Figure 10:
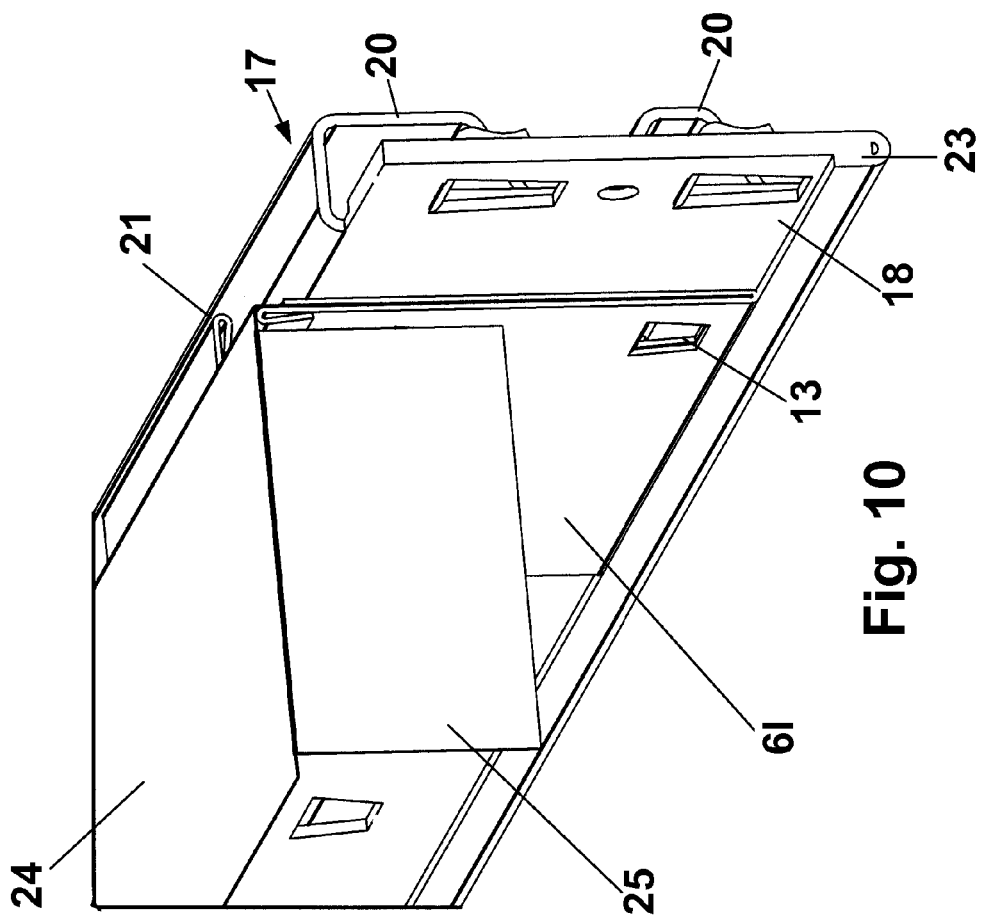
FIG. 10 is a perspective view according to FIG. 9.
Figure 9:
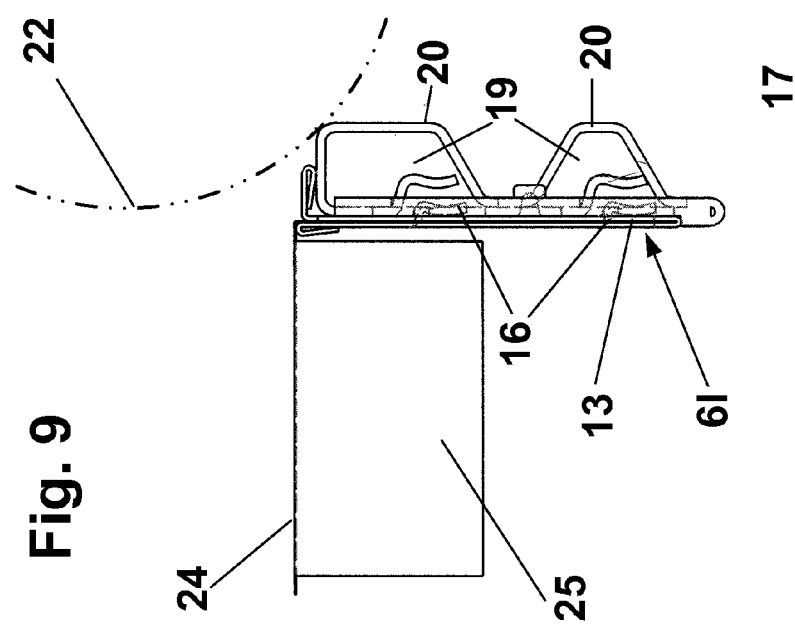
FIG. 9 is a side view according to FIG. 7 with a strut and a shelf bottom.

As can be seen in FIGS. 9 and 10, the tire carrier 17 exhibits a support 21 on its upper side, i.e. on the outside of the upper bulge 20, on which the strut 6 is laid and on which the wheel 22 to be stored or the tire rests, as is indicated by the dash-dot-dot-dash line in FIG. 9.

The downward-facing edges of the hollow profile of the tire carrier 17 are folded into one another 23.

A shelf bottom 24 is suspended into the strut 6 by clamping. For that purpose, the strut 6 is designed in the form of a pocket. A downward protruding side wall 25 is articulated on each of the sides of the shelf bottom 24, which engages into the pocket of the strut 6 and is clamped thereby.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A knockdown shelving system for storing vehicle wheels or tires, comprising:
    a plurality of connected shelves with storage compartments that are configured to store vehicle wheels or tires upright and parallel to each other, the wheels or tires resting on their running surface;
    vertical posts located at each corner of the connected shelves and shared between adjacent shelves, the vertical posts being formed of a rolled hollow T-profile having a T-shaped cross-section and vertical edges folded into one another at a lower end of a stem section of the T-profile;
    longitudinally spaced perforations of identical form, size, and spacing, extending along the vertical posts, wherein each vertical post comprises
        two rows of longitudinally spaced perforations spaced apart from one another arranged at a flange section of the T-profile opposite the stem section of the T-profile,
        one row of longitudinally spaced perforations arranged at each side of the flange section of the T-profile,
        one row of longitudinally spaced perforations arranged at each side of the flange section facing the stem section of the T-profile, and
        one row of longitudinally spaced perforations arranged at each side of a stem section of the T-profile;
    lengthwise and crosswise struts with two vertically separated downward-directed hooks arranged at each end, the hooks being configured to engage vertically into the perforations of the vertical posts;
    tire carriers configured to be placed onto the lengthwise struts, comprising
        a rear wall,
        two bulges arranged on top of one another, each forming a cavity, and
        tire carrier perforations through which the hooks of the lengthwise struts engage the perforations of the vertical posts; and
    storage compartments for tires or wheels formed by two tire carriers extending parallel between front and rear vertical posts, and by crosswise struts extending perpendicular to the tire carriers between two front vertical posts and two rear vertical posts, respectively.

2. A knockdown shelving system as in claim 1, wherein the tire carriers comprise a support surface on their upper side, on which the struts are laid and on which the wheels or the tires rests.

3. A knockdown shelving was in claim 1, wherein the tire carriers consist of a rolled hollow profile, and wherein downward-facing edges of the hollow profile are folded into one another.

4. A knockdown shelving system as in claim 1, further comprising a shelf bottom with a downward protruding side wall, wherein the shelf bottom is clamped between struts, and wherein the struts comprise a pocket which engages the side wall of the shelf bottom.

* * * * *